United States Patent [19]

Puhak

[11] 4,030,126

[45] June 14, 1977

[54] SUPPORT MEANS FOR A CRT BEAM ADJUSTMENT DEVICE

[75] Inventor: Peter George Puhak, Seneca Falls, N.Y.

[73] Assignee: GTE Sylvania Incorporated, Stamford, Conn.

[22] Filed: Jan. 16, 1976

[21] Appl. No.: 649,684

[52] U.S. Cl. ................................ 358/248; 335/212

[51] Int. Cl.$^{2}$ ...................... H04N 5/645; H01F 7/02

[58] Field of Search ............ 358/248, 249; 335/212

[56] References Cited

UNITED STATES PATENTS

| | | | |
|---|---|---|---|
| 2,860,329 | 11/1958 | Reiches | 358/248 |
| 3,290,532 | 12/1966 | Lemke | 358/248 |
| 3,410,955 | 11/1968 | Mackey | 358/248 |

*Primary Examiner*—Howard W. Britton

*Attorney, Agent, or Firm*—Norman J. O'Malley; Frederick H. Rinn; Robert T. Orner

[57] ABSTRACT

An improved CRT beam adjustment device is provided for exterior orientation on the neck of the tube. The device includes a plurality of rotatably adjustable annulate magnetic members sequentially positioned on a support sleeve, one end thereof being formed to have a plurality of tongue-like extensions, each having a terminal protuberance extending radially outward therefrom. Each protuberance has a surface facing the annulate member that is downward sloping toward the body of the sleeve. An adjustable ring clamp is positioned to ride on the slanted surface of the protuberance and abut the adjacent magnetic members, thereby providing by one adjustment, pressure to positionally lock the adjusted members while simultaneously affixing the device to the neck of the tube.

8 Claims, 8 Drawing Figures

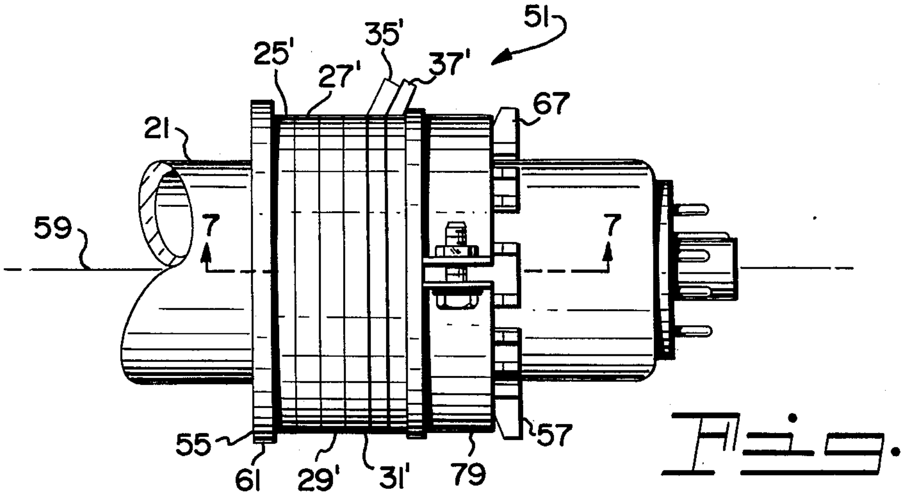
Fig. 4
Fig. 5
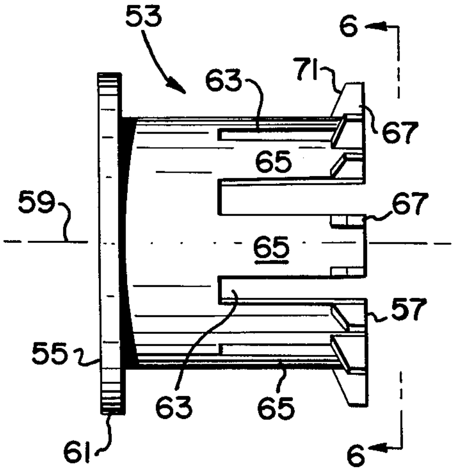
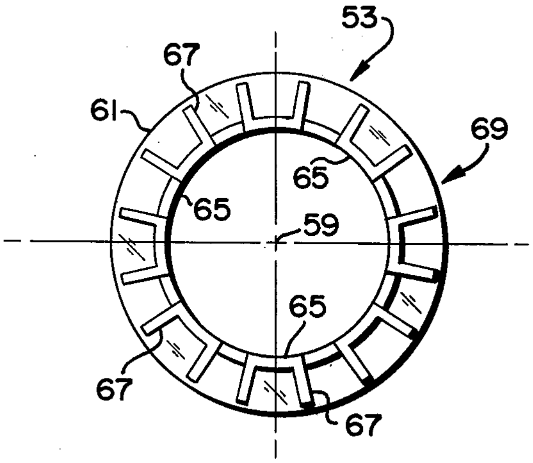
Fig. 6
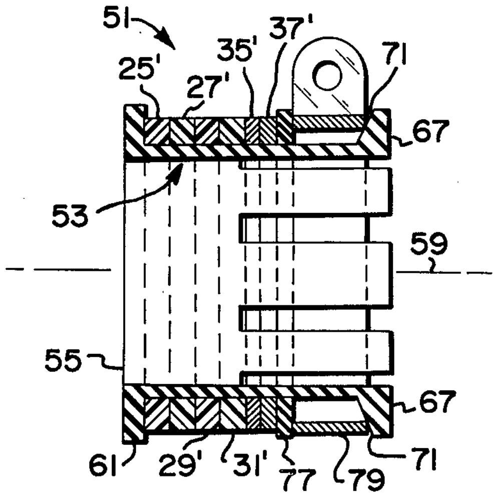
Fig. 7
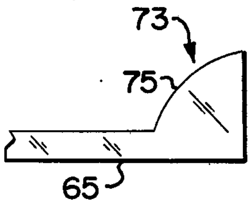
Fig. 8

SUPPORT MEANS FOR A CRT BEAM ADJUSTMENT DEVICE

BACKGROUND OF THE INVENTION

This invention relates to external means for influencing electron beams within a color cathode ray tube and more particularly, to support means for exteriorly positioning and retaining a beam adjustment device on the neck portion of a color cathode ray tube.

Cathode ray tubes of the type conventionally employed in color television applications usually utilize several electron beams emitted from electron generating means oriented within the neck portion of the tube. These several beams are discretely directed to transverse an apertured mask member and impinge a patterned cathodoluminescent screen spatially disposed therebeyond on the panel portion of the tube to effect a predetermined display of imagery thereon. For the beams to accurately converge and impinge discrete areas of the screen pattern in the desired manner, it is imperative that the individual beams be accurately controlled in their travel to the screen. External control of the respective electron beams is augmented by a beam adjustment device formed for positioning on the exterior surface of the neck portion of the tube envelope in the region of the electron gun structure. For example, one such control means commonly referenced as a static convergence and purity device is conventionally comprised of a plurality of sequentially oriented annulate magnetic members and associated purity rings contiguously related in a manner to be individually rotatably adjustable on the neck portion of the tube.

One support means commonly utilized in the art for positioning and retaining these related magnetic members, embodied a cylindrical insulative sleeve having integral stop means formed thereon beyond which a clamp ring was positioned over tongue-like projections and tightened to hold the assembly upon the neck of the tube. In the assembled and positioned device, the annulate magnetic members and purity rings being positioned on the sleeve ahead of the stop means, were separately rotated to achieve the proper adjustment of the beams in the operating tube, whereupon a terminal threaded ring was tightened to collectively hold or lock the annulate members in proper adjusting positioning. This system was prone to a troublesome drawback evidenced in tightening of the terminal locking member. If the circumferential movement employed in securely tightening this member was greater than the holding power of the previously fastened clamp ring, the whole assembly was rotatably shifted on the neck portion of the tube. As a result, the complete adjustment procedure had to be repeated.

OBJECTS AND SUMMARY OF THE INVENTION

It is an object of the invention to reduce and obviate the aforementioned disadvantages evidenced in the prior art. Another object of the invention is to provide a support and positioning means for the annulate magnetic members whereof circumferential movement in positionally locking the adjusted members is eliminated. A further object of the invention is to provide support and positioning means wherein affixation of the support means upon the neck of the tube and the positional locking of the adjusted annulate magnetic components is accomplished in a single adjustment procedure.

These and other objects and advantages are achieved in one aspect of the invention wherein support means for exteriorly positioning and retaining beam adjustment means on the exterior of the neck portion of a cathode ray tube is in the form of a cylindrical insulative support sleeve having an internal diameter dimensioned to facilitate telescopic sliding placement of the neck portion and an external diameter dimensioned to accommodate the annulate magnetic components positioned thereon. The forward portion of the sleeve has a terminus formed as an outstanding circumferential member to provide stop means for the assembled magnetic members of the device. The rear portion of the sleeve is formed to have a plurality of spaced apart longitudinal slits therein parallelly oriented to provide a plurality of similar tongue-like longitudinal extensions of the sleeve. Each of these extensions has at least one terminally oriented protuberance formed to extend radially outward therefrom to collectively effect a circular array around the end of the sleeve. The surface of each protuberance oriented toward the annulate components is an angularly related surface sloping toward the body of the sleeve. An insulative spacer ring is positioned on the sleeve between the protuberances and the magnetic members, whereupon a ring-type adjustable clamp, having a circumferential dimension less than that of the annular array of protuberances and greater than that of the sleeve proper, is positioned between the protuberances and the spacer ring in a manner to about the ring and ride on the sloping surfaces of the protuberances. By this arrangement, adjustment of the riding clamp simultaneously exerts longitudinally directed pressure to positionally lock the several adjusted annulate members and circumferentially directed pressure to affix the support means of the device securely upon the neck of the tube.

BRIEF DESCRIPTION OF THE DRAWINGS

FIG. 4 is an illustration of a portion of the neck of a cathode ray tube showing the beam adjustment device utilizing the support means of the invention;

FIG. 5 is a view of the cylindrical support sleeve for the device as utilized in FIG. 4;

FIG. 6 is an end view of the support sleeve taken along the line 6—6 of FIG. 5;

FIG. 7 is a cross-sectional view of the device shown in FIG. 4 taken along the line 7—7 thereof illustrating the dual function of the adjustable riding band clamp. FIG. 7 depicts the assembled structure of the beam adjustment device before positioning upon the neck portion of the tube; and FIG. 8 illustrates another configuration embodiment of the terminally oriented proturberances.

DESCRIPTION OF THE PREFERRED EMBODIMENT

For a better understanding of the present invention, together with other and further objects, advantages, and capabilities thereof, reference is made to the following specification and appended claims in connection with the aforedescribed drawings.

Figure 1:
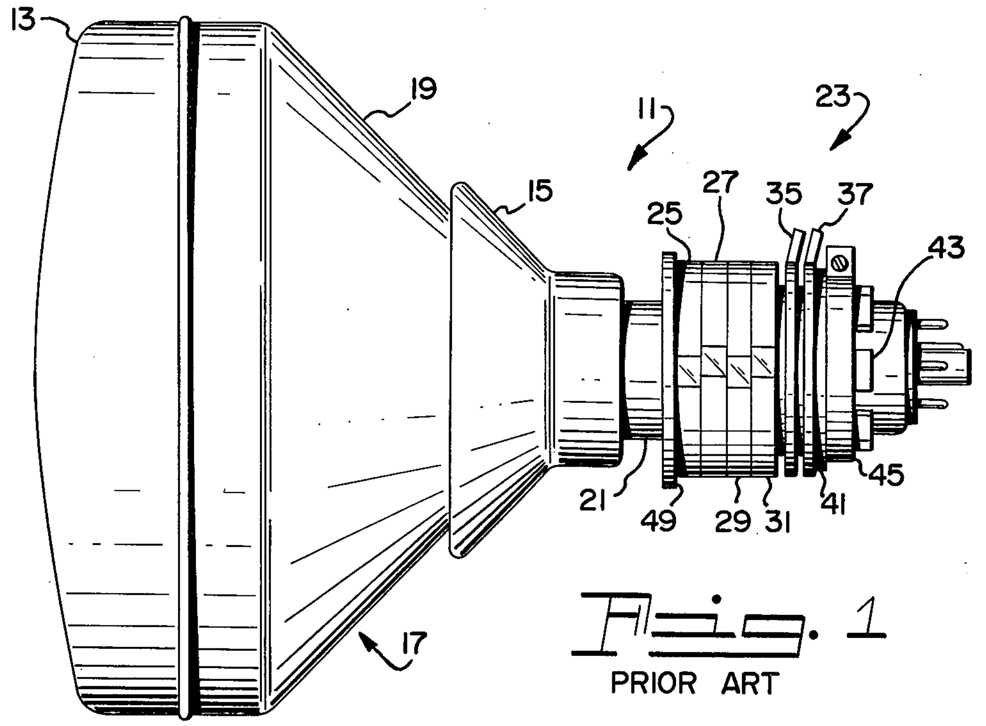
Fig. 1 PRIOR ART
FIG. 1 is a view of a color cathode ray tube illustrating the orientation of a prior art electron beam adjustment device on the exterior of the neck portion thereof.

With reference to the drawings, there is shown in FIG. 1, a cathode ray tube 11 of the type conventionally employed in color television applications. Such tubes commonly utilize a plurality of electron beams emanating internally from electron generating means in either delta or in-line orientation. The paths of the respective beams, which are directed to converge at an apertured member in the region of the screen, are partially controlled by several devices oriented on the exterior of the tube envelope. The image display raster, which is visible upon the cathodoluminescent screen disposed on the viewing portion of the face panel 13, is formed by the electron beams which are partially controlled by magnetic fields effected by the coils of the yoke member 15, such member being positioned upon the tube envelope 17 at substantially the transitional region between the funnel 19 and neck 21 portions thereof. Positioned rearward therefrom on the neck portion of the tube are beam adjustment means 23 in the form of an exemplary static convergence and purity device containing a plurality of adjustable magnetic components arranged to impart a controlling field which is essential to effect the desired shifting of the beams. This beam convergence device 23, which for example is of the type employed to produce static convergence of a substantially in-line arrangement of beams, is comprised of a plurality of sequentially oriented and related annulate magnetic members, such as 25, 27, 29 and 31, each of which has a similar aperture formed therein of the size to facilitate slidable placement on an insulative cylindrical support sleeve encompassing the neck portion of the tube. These magnetic members, which are selectively magnetized and well known in the art, are rotatably adjustable on the support sleeve to effect horizontal and vertical convergence of the beam means at the apertured mask spatially associated with the cathodoluminescent screen within the tube 11.

Mounted rearward of the aforenoted magnetic members is the purity ring portion of the device 23 comprised of two magnetized rings 35 and 37 which are also formed to be individually rotatable upon the support sleeve. Selective rotation of the purity rings orients a magnetic field to exert a force to move the electron beams transversely to thereby align them with the mask apertures and the respective patterned screen elements therebeyond.

Figure 2:
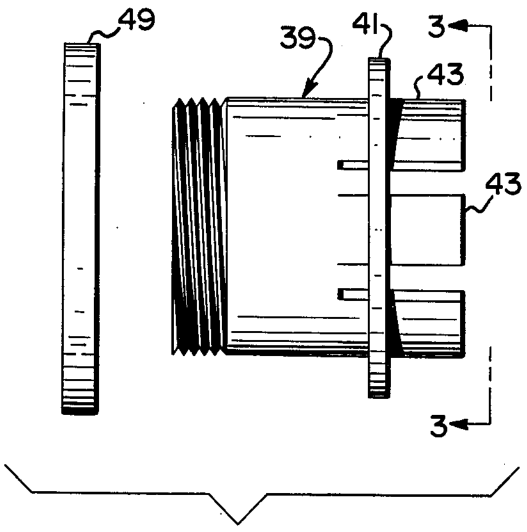
Fig. 2 PRIOR ART
FIG. 2 is an enlarged view of the prior art support sleeve of the beam adjustment device shown in FIG. 1.
Figure 3:
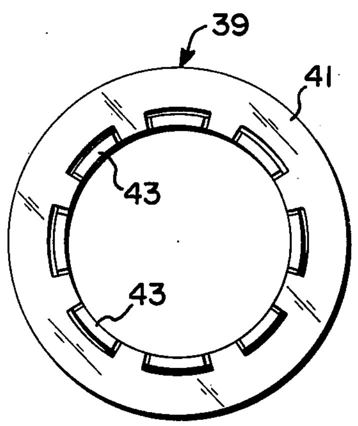
Fig. 3 PRIOR ART
FIG. 3 is an end view of the support sleeve shown in FIG. 2 taken along the line 3—3 thereof.

The exemplary prior art static convergence and purity device 23 as shown in FIG. 1 was normally assembled as a unit prior to placement upon the neck of the tube 11. The support sleeve 39 for this particular structure is further delineated in FIGS. 2 and 3, wherein a stop ring member 41 was integrally formed as part of the cylindrical sleeve, adjacent to longitudinally extending tongue-like sleeve projections 43, which were subsequently encompassed by the adjustable clamp ring 45 to securely affix the device 23 on the neck 21 of the tube 11. The forward end 47 of the sleeve was suitably threaded to accept a compatibly threaded terminal ring member 49.

In assembling this prior art device 23, the purity rings 35 and 37, and the associated annulate magnetic members 25, 27, 29 and 31, were placed upon the support sleeve 39 from the forward end 47 in a manner to abut the stop ring 41, whereupon the threaded terminal ring 49 was applied to integrate the assembly. The device 23 was then placed upon the neck of the tube 11, whereupon the clamp ring encompassing the tongue-like projections 43 of the sleeve 33, was tightened to affix the device upon the cylindrical neck member. The tube was then subjected to a desired operational mode, and the rotatable magnetic members of the device adjusted to achieve the desired beam influencing results, whereupon the threaded terminal ring was tightened by rotative movement to hold the several magnetic members in proper adjusted positioning. It was found that the circumferential tightening force applied to the terminal ring was sometimes of a torque value greater than the holding force of the clamp member, thereby the entire device was deleteriously rotated upon the neck of the tube. Such mispositioning necessitated a complete repetition of the adjustment procedure.

The invention beneficially overcomes the shortcomings evidenced in the prior art. The improved beam adjustment device 51 as shown in FIGS. 4, 5, 6 and 7 utilizes a differently designed cylindrical support sleeve 53, such being formed of an insulative resilient plastic material, and having substantially opposed, alpha 55 and beta 57 end portions and a longitudinal axis 59 therethrough. The sleeve 53 exhibits an internal diameter dimensioned to facilitate sliding telescopic placement upon the neck portion 21 of the tube, and an external diameter dimensioned to accommodate positioning of the several annulate magnetic members 25′, 27′, 29′ and 31′ and magnetic rings 35′ and 37′ thereon. The alpha end portion 55 has a terminus formed as an outstanding circumferential member 61 which provides stop means for the respective annulate members. The opposing beta end portion 57 of the sleeve has a plurality of substantially similar spaced-apart longitudinal slits 63 formed therein which extend substantially half the longitudinal length of the sleeve 53. These longitudinal slits 63 are oriented parallel with the axis 59 to form a plurality of substantially similar tongue-like longitudinal extensions 65 of the sleeve. Each of these extensions has at least one terminally oriented protuberance 67 formed to extend radially outward therefrom. In the embodiment shown, each of the tongue-like extensions has two terminal protuberances integrally formed thereon. Collectively, these circumferentially related protuberances effect a circular array 69 around the beta end 57 of the sleeve. As shown in FIGS. 4, 5 and 7, the protuberances 67 are of substantially trapazoidal shape whereof each structure provides a slanting surface 71, oriented toward the annulate members, that is formed as in inclined plane sloping toward the body of the sleeve 53. Another exemplary protuberance embodiment is that configuration 73 shown in FIG. 8 wherein the surface 75 thereof, facing the annulate members and sloping toward the body of the sleeve 53, is of arcuate shaping.

In assembling of components of the beam adjustment device 51, prior to placement on the neck of the tube 11, the resiliency of the multiple tongue portions 65 of the sleeve is sufficient to permit temporary circumferential constriction of the circular array 69 of protuberances to facilitate the passage of the aforenoted annulate members and magnetic rings thereover to effect positioning of these components on the sleeve. A spacer ring 77, dimensioned for sliding placement upon the sleeve, is then positioned thereon between the annulate members and the protuberances 67. A ring-type band clamp 79 having associated adjustable means 81 and a circumferential dimension less than that of said annular array of protuberances 69 and greater than that of said sleeve 53, is positioned between the protuberances 67 and the ring spacer 77 in a manner to abut the ring and ride on the slanted surface 71 of the inclined planes of the protuberances 67. The assembled beam adjustment device 51 is then placed upon the neck portion of the tube 11. Subsequently, upon activation of the tube to a desired operating mode, the annulate members are rotatably adjusted to effect the desired beam positioning results; whereupon, the adjustable means 81 of the ring-type band clamp 79 is tightened to simultaneously exert longitudinally directed pressure to positionally lock the adjusted annulate rings and circumferentially directed pressure to securely affix the support means 53 upon the neck of the tube. Thus, a tightening of one adjustment means 81 accomplishes the dual function of locking the adjustment of the annulate members in conjunction with simultaneous affixation of the device to the neck. This beneficial one-adjustment feature manifests an absence of opposing forces and thereby eliminates the possibility of slippage misalignment of the device as evidenced in the prior art.

While there has been shown and described what are at present considered the preferred embodiments of the invention, it will be obvious to those skilled in the art that various changes and modifications may be made therein without departing from the scope of the invention as defined by the appended claims.

What is claimed is:

1. Support means for exteriorly positioning and retaining a beam adjustment device formed a plurality of sequentially oriented annulate magnetic members on the neck portion of a cathode ray tube, said support means comprising:

a cylindrical support sleeve formed of insulative material having substantially opposed alpha and beta end portions and a longitudinal axis therethrough, said sleeve having an internal diameter to facilitate sliding placement on said neck portion and an external diameter dimensioned to accommodate said annulate members positioned thereon, said alpha end portion having a terminus formed as an outstanding circumferential member to provide stop means for said annulate members, said beta end portion of said cylindrical sleeve having a plurality of spaced apart longitudinal slits therein oriented parallel with said axis to form a plurality of substantially similar tongue-like extensions of said sleeve, each of said extensions having at least one terminally oriented protuberance formed to extend radially outward therefrom to effect an outstanding circular array around the beta end of said sleeve, the surface of each protuberance oriented toward said annulate members being an angularly related surface sloping toward the body of said sleeve;

a spacer ring dimensioned for sliding placement upon said sleeve, said ring being positioned thereon between said protuberances and said annulate members; and a ring-type band clamp having associated adjustable means and a circumferential dimensions less than that of said annular array of protuberances and greater than that of said sleeve, said band clamp being positioned between said protuberances and said spacer ring in a manner to abut said ring and ride on said sloping surfaces of said protuberances to simultaneously exert longitudinally directed pressure to positionally lock said annulate rings and circumferentially directed pressure to affix said support means upon said neck.

2. Support means according to claim 1 wherein said cylindrical support shell is formed of a resilient plastic material.

3. Support means according to claim 2 wherein the resiliency of the tongued-portion of said plastic sleeve is sufficient to permit the circumferential constriction of said circular array to facilitate the passage of said annulate members thereover for positioning on said sleeve.

4. Support means according to claim 1 wherein the spaced apart longitudinal slits in said support sleeve extends substantially half the longitudinal length thereof.

5. Support means according to claim 2 wherein each of said tongue-like extensions has two terminal protuberances integral therewith.

6. Support means according to claim 1 wherein said protuberances are substantially trapazoidally shaped whereof the surface oriented toward said annulate member and said stop means is formed as in inclined plane sloping toward the body of said sleeve.

7. Support means according to claim 1 wherein said protuberances are formed to have a substantially arcuate surface oriented toward said annulate members and said stop means, said surface sloping toward the body of said sleeve.

8. Support means according to claim 1 wherein said outstanding circumferential member is constructionally formed as an integral terminal part of the alpha portion of said sleeve.

* * * * *